US011102067B2

(12) United States Patent
Pannem et al.

(10) Patent No.: US 11,102,067 B2
(45) Date of Patent: Aug. 24, 2021

(54) METHOD AND SYSTEM PROVIDING AUTOMATED SUPPORT FOR CROSS-CLOUD HYBRIDITY SERVICES

(71) Applicant: VMware, Inc., Palo Alto, CA (US)

(72) Inventors: Hemanth Kumar Pannem, Cupertino, CA (US); Aarti Kumar Gupta, Mountain View, CA (US); Sachin Thakkar, San Jose, CA (US); Furkan Shaikh, Cupertino, CA (US); Kim Tran, Milpitas, CA (US); Lu Yu, San Francisco, CA (US); Venu Gopala Rao Kotha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 264 days.

(21) Appl. No.: 16/047,999

(22) Filed: Jul. 27, 2018

(65) Prior Publication Data

US 2020/0036581 A1   Jan. 30, 2020

(51) Int. Cl.
*H04L 12/24* (2006.01)
*H04L 29/08* (2006.01)

(52) U.S. Cl.
CPC .......... *H04L 41/082* (2013.01); *H04L 41/069* (2013.01); *H04L 67/10* (2013.01)

(58) Field of Classification Search
CPC .............. H04L 41/069; H04L 41/5074; H04L 41/0672; H04L 41/082; H04L 67/01
See application file for complete search history.

(56) References Cited

U.S. PATENT DOCUMENTS

| 9,348,652 | B2* | 5/2016 | Raghu | H04L 41/22 |
|---|---|---|---|---|
| 9,866,464 | B1* | 1/2018 | Miltenberger | H04L 51/24 |
| 2008/0168167 | A1 | 7/2008 | Carlson et al. | |
| 2011/0252100 | A1 | 10/2011 | Raciborski et al. | |
| 2014/0372805 | A1* | 12/2014 | Rijnders | G06Q 10/06311 |
| | | | | 714/37 |
| 2015/0046512 | A1* | 2/2015 | Ashby | H04L 43/08 |
| | | | | 709/203 |
| 2015/0180949 | A1 | 6/2015 | Maes et al. | |

(Continued)

OTHER PUBLICATIONS

Tran et al., "Fault Resolution System for Inter-Cloud Environment", 2014, Journal of Mobile Multimedia, vol. 10, No. 1&2 016-029. (Year: 2014).*

(Continued)

*Primary Examiner* — Tonia L Dollinger
*Assistant Examiner* — Jonathan A Sparks
(74) *Attorney, Agent, or Firm* — Patterson + Sheridan, LLP (57) ABSTRACT

Techniques disclosed herein manage and resolve incidents in hybridity manager applications, without the back-and-forth manual steps of the traditional software support lifecycle. In one embodiment, a virtual network operations center (NOC) with a centralized view of distributed, cross-cloud hybridity manager installations is responsible for tracking incident reports relating to hybridity managers and associated bugs, and the virtual NOC automatically publishes notifications of upgrade builds that fix the tracked bugs to the appropriate hybridity managers. When the same bug is encountered again with another hybridity manager instance, the virtual NOC may also publish an upgrade notification to the other hybridity manager instance, without requiring a support ticket to be filed, etc.

19 Claims, 6 Drawing Sheets

(56) References Cited

U.S. PATENT DOCUMENTS

| | | | |
|---|---|---|---|
| 2016/0117162 A1* | 4/2016 | Searle | H04L 41/0893 717/173 |
| 2016/0173486 A1* | 6/2016 | Abbott | G06F 21/6245 713/175 |
| 2016/0301734 A1* | 10/2016 | Henderson | H04L 41/069 |
| 2017/0041189 A1 | 2/2017 | Aswathanarayana et al. | |
| 2017/0060615 A1 | 3/2017 | Thakkar et al. | |
| 2017/0155550 A1 | 6/2017 | Cooper | |
| 2017/0279702 A1* | 9/2017 | Mah | G06F 11/0703 |
| 2018/0063074 A1 | 3/2018 | Shankarappa et al. | |
| 2018/0307714 A1* | 10/2018 | Pignataro | G06F 16/22 |
| 2018/0315055 A1* | 11/2018 | Pickover | H04L 9/3297 |
| 2019/0116178 A1* | 4/2019 | Coffey | H04L 9/3239 |
| 2020/0036582 A1 | 1/2020 | Pannem et al. | |
| 2020/0265375 A1* | 8/2020 | Azad | G06Q 10/0639 |
| 2021/0135959 A1* | 5/2021 | Ricks | H04L 41/06 |

OTHER PUBLICATIONS

Tran, Ha & Le, Son. (2014). "Software Bug Ontology Supporting Bug Search on Peer-to-Peer Networks. New Generation Computing". 32. 145-162. 10.1007/s00354-014-0203-1. (Year: 2014).*

H. M. Tran and J. Schönwälder, "DisCaRia—Distributed Case-Based Reasoning System for Fault Management," in IEEE Transactions on Network and Service Management, vol. 12, No. 4, pp. 540-553, Dec. 2015, doi: 10.1109/TNSM.2015.2496224. (Year: 2015).*

Robb, Drew, What is a NOC, and How It Improves Data Center Availability, May 5, 2017, http://www.datacenterknowledge.com/archives/2017/05/05/what-is-a-noc-and-how-it-improves-data-center-availability, 13 pages.

Vmware Hybrid Cloud Extension, App Mobility and Infrastructure Hybridity Across Any-to-Any vSphere, https://cloud.vmware.com/vmware-hcx, 7 pages.

Allwyn Sequeira, Vmware Hybrid Cloud Extension for VMware Cloud on AWS, Nov. 28, 2017, https://blog.cloud.vmware.com/s/content/a1y6A000000aFq8QAE/vmware-hybrid-cloud-extension-for-vmware-cloud-on-aws, 9 pages.

Julie Inlow Munoz et al., Vmware HCX on IBM Cloud (aka "space age IT")—now available!, Jan. 29, 2018, https://www.ibm.com/blogs/bluemix/2018/01/vmware-hcx-ibm-cloud-aka-really-cool-space-age-kind-now-available/, 8 pages.

Vmware Hybrid Cloud Extension, Making hybrid a reality: App mobility and infrastructure hybridity across any-to-any vSphere cloud, https://ovhcloud.com/products/hosted-private-cloud/vmware-hcx#, 13 pages.

* cited by examiner

METHOD AND SYSTEM PROVIDING AUTOMATED SUPPORT FOR CROSS-CLOUD HYBRIDITY SERVICES

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack® open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as virtual machines, to be rapidly moved from the data center to the cloud.

A traditional software support lifecycle includes a user of software (e.g., hybrid cloud computing software) calling customer support to report an incident, the support team asking the user to gather and upload logs that may be analyzed by an engineering team, development efforts to fix any identified bugs with a patch build of the software, uploading the build to a file transfer protocol (FTP) server and notifying the user of the same, downloading of the build by the user who then confirms whether the incident is resolved by the build, and repeating the cycle if the incident has not been resolved. Such a support lifecycle can involve many back-and-forth manual steps, and the same manual steps may be repeated multiple times by different users who experience the same issue with the software.

SUMMARY

One embodiment disclosed herein provides a computer-implemented method. The method generally includes receiving, from a first hybridity manager in a first on-premise or cloud computing system of a hybrid cloud computing system, a first report of an incident, and submitting, to a support system, information on the incident from the first report. The method also includes storing a mapping between an identifier (ID) of an issue associated with the incident and an ID of the first hybridity manager, wherein the association between the issue and the incident is determined by monitoring the support system. Further, the method includes retrieving troubleshooting logs from the first on-premise or cloud computing system and one or more paired cloud or on-premise computing systems. In addition, the method includes responsive to a hybridity manager build being registered that is specified as fixing the issue, pushing a first upgrade notification to the first hybridity manager based, at least in part, on the stored mapping between the ID of the issue and the ID of the first hybridity manager.

Further embodiments include computer systems configured to carry out the above methods, and non-transitory computer-readable storage media comprising instructions that cause the computer systems to carry out the above methods.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein provide techniques for managing and resolving incidents in hybridity manager applications, without the back-and-forth manual steps of the traditional support lifecycle. As used herein, a "hybridity manager" refers to an application running in either an on-premise computing system controlled and administrated by a particular enterprise or business organization, or in a cloud computing system operated by a cloud computing service provider and exposed as a service, with the hybridity manager being configured to manage computing resources provided by the virtualized or cloud computing system and, together with hybridity manager(s) running in remote (cloud or virtualized computing system) site(s), integrate the computing resources across those site(s) to form a unified "hybrid" computing platform. In one embodiment, a virtual network operations center (NOC) with a centralized view of distributed, cross-cloud hybridity manager installations in the hybrid cloud computing system is responsible for tracking incident reports relating to hybridity managers and bugs that are associated with those incidents, and the virtual NOC automatically publishes notifications of upgrade builds that fix the tracked bugs to the appropriate hybridity managers. In such a case, the virtual NOC may perform operations including (1) filing a support ticket with a support system whenever an incident report is received from a hybridity manager, (2) maintaining a mapping of an identifier (ID) of the support ticket to an ID of the hybridity manager that sent the incident report as well as a mapping of the hybridity manager ID to an ID of a bug if the support system is updated to indicate that the incident has resolved into the bug, (3) initiating distributed log collection from the virtualized or cloud computing system in which the hybridity manager runs and paired cloud or virtualized computing system(s), respectively, and (4) publishing an upgrade notification to the hybridity manager whenever a new build that is specified (in metadata) as fixing the bug is registered with the virtual NOC. When the same bug is encountered again with another hybridity manager instance, the virtual NOC may also publish an upgrade notification to the other hybridity manager instance, without requiring a support ticket to be filed, etc.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
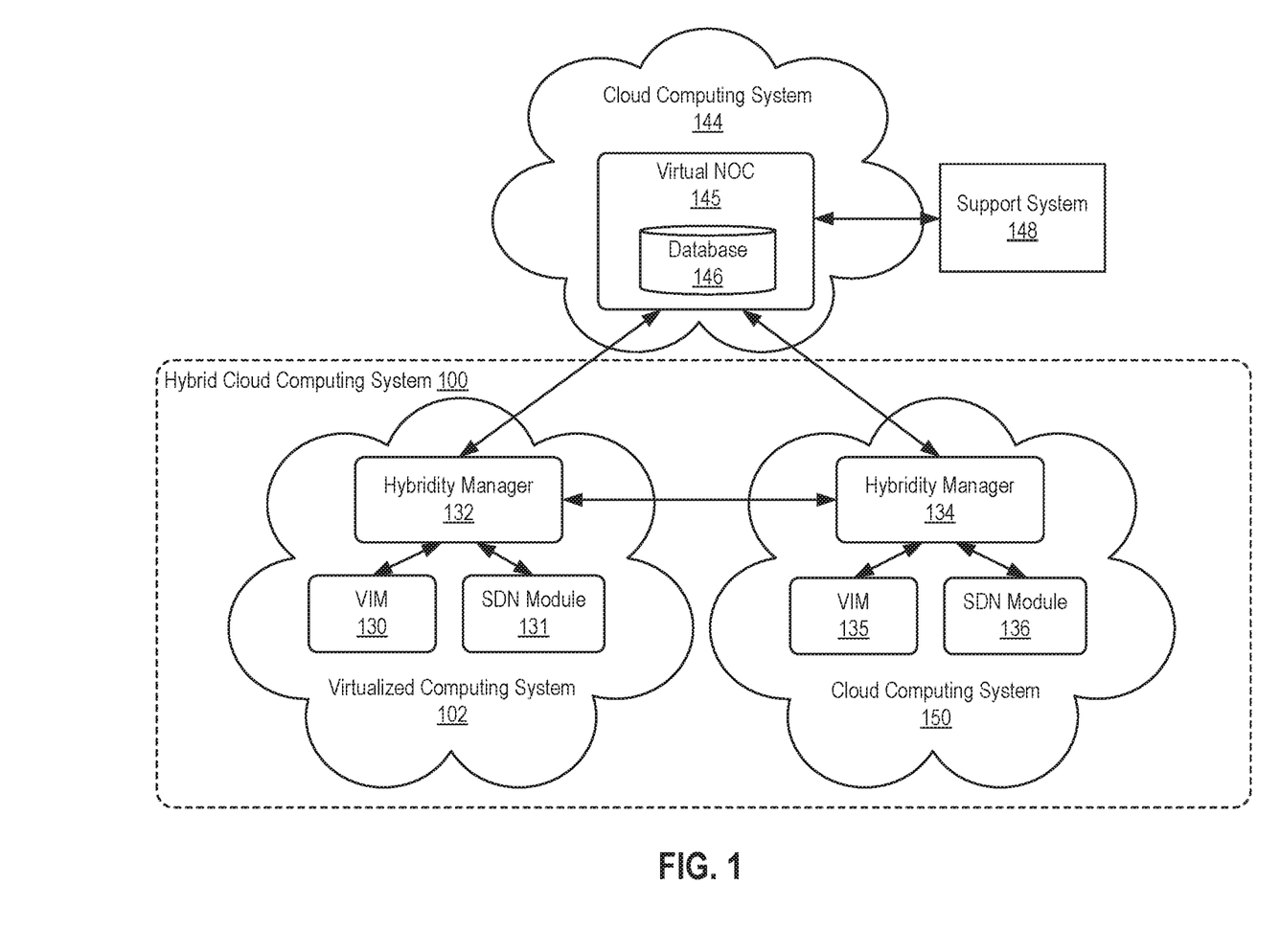
FIG. 1 illustrates an approach for automating support for cross-cloud hybridity services, according to an embodiment.

FIG. 1 illustrates an approach for automating support for cross-cloud hybridity services, according to an embodiment. Illustratively, a hybrid cloud computing system 100 includes a virtualized computing system 102 and a cloud computing system 150. As described, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an "on-premise" data center, and cloud computing system 150 may be referred to as a "public" cloud service. As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud computing system, a tenant may be provided with seamless access to one or more private cloud resources and/or public cloud resources.

As shown, hybridity managers 132 and 134 run in virtualized and cloud computing systems 102 and 150, respectively. Hybridity managers 132 and 134 are configured to integrate virtualized computing resources provided by virtualized and cloud computing systems 102 and 150 in order to form a unified "hybrid" computing platform. In a particular embodiment, hybridity managers 132 and 134 may be enterprise and cloud components, respectively, of the Hybrid Cloud extension (HCX) product that is commercially available from VMware, Inc. of Palo Alto, Calif. Hybridity managers 132 and 134 such as HCX enterprise and cloud may abstract computing resources of virtualized and cloud computing systems 102 and 150, presenting the resources to applications as one continuous hybrid cloud. In addition, hybridity managers 132 and 134 may create high-performance, secured, and optimized interconnects between virtualized and cloud computing systems 102 and 150, as discussed in greater detail below, with the abstraction of the computing resources and the site interconnects providing infrastructure hybridity that enables application mobility and disaster recovery across virtualized and cloud computing systems 102 and 150. In particular, hybridity managers 132 and 134 are essentially mirror images of one another, with each side being able to send applications or virtual computing instances (e.g., VMs or containers) of those applications to the other via a site interconnect.

Illustratively, hybridity manager 132 is in communication with a virtualization infrastructure manager (VIM) 130 and a software defined network (SDN) module 131, which also run in virtualized computing system 102 and are configured to manage infrastructure and network virtualization, respectively, in virtualized computing system 102. One example of a VIM is the vCenter Server® product made available from VMware, Inc. of Palo Alto, California. Examples of SDN modules include VMware NSX-V (NSX® for vSphere®) and NSX-T, available from VMware, Inc. As discussed in greater detail below, VIM 130 and SND module 131 are required by hybridity manager 132 in order to provide the hybrid cloud computing platform. Such required applications are also referred to herein as "dependent components," and each dependent component in virtualized computing system 102 is configured to register with hybridity manager 132. Likewise, hybridity manager 134 is in communication with dependent components in cloud computing system 150, shown as VIM 135 and SDN module 136, each of which registers with hybridity manager 134.

A virtual NOC 145, which runs in another cloud computing system 144 (but may also run elsewhere), is configured to act as a centralized management control center that oversees hybridity manager instances (e.g., hybridity managers 132 and 134) running in on-premise and cloud computing systems (e.g., virtualized and cloud computing systems 102 and 150). Virtual NOC 145 may be implemented as a software as a service (SaaS) that is deployed in cloud computing system 144. In particular, virtual NOC 145, as well as hybridity managers 132 and 134, may be implemented using a micro services-based architecture in one embodiment. In such a case, each feature of virtual NOC 145 may be a service that can be enabled or disabled through configuration, and hybridity managers 132 and 134 may share the same base code but have different services enabled. That is, the micro-services architecture allows the application to take polymorphic avatars depending on where the application is deployed, as either an on-premise hybridity manager (e.g., hybridity manager 132), a cloud hybridity manager (e.g., hybridity manager 134), or as a virtual NOC (e.g., virtual NOC 145). Further, virtual NOC 145 may in one embodiment provide various services, including activation, publisher, telemetry, and observability services, to hybrid cloud components such as hybridity manager instances, as discussed in greater detail below.

As shown, virtual NOC 145 is in communication with hybridity managers 132 and 134, as well as with a support system 148, which may be any suitable support system for managing incidents such as the publicly available Jira® issue tracking software or Developer Center Partner Network (DCPN) for VMware® software defined data centers. In one embodiment, virtual NOC 146 includes a plugin configured to integrate with various support systems to file support tickets, monitor the support tickets for changes, and collect information from the support systems that may then be stored in virtual NOC 145. Although these steps are discussed herein for simplicity as being performed by virtual NOC 145, it should be understood that one or more of the steps may be performed specifically by a plugin within virtual NOC 145 in some embodiments.

As discussed in greater detail below, virtual NOC 145 automatically files a support ticket with support system 148 whenever an incident report is received from a hybridity manager (e.g., hybridity manager 132 or 134) that is registered with virtual NOC 145. Such an incident report may be entered manually into a UI for the hybridity manager and thereafter sent by the hybridity manager to virtual NOC 145. Virtual NOC 145 then stores in its database 146 a mapping of an ID of the support ticket that is provided by support system 148 to an ID of the hybridity manager from which the incident report was received, and further returns the support ticket ID to the hybridity manager for display via a user interface (UI).

Thereafter, virtual NOC 145 automatically initiates the distributed collection of troubleshooting logs from the virtualized or cloud computing system in which the hybridity manager runs, as well as from paired cloud or virtualized computing systems, respectively, and sends such logs to support system 148. In one embodiment, a remote job framework may be used by virtual NOC 145 to spawn jobs with tasks that execute in the virtualized or cloud computing system and paired systems to collect the troubleshooting logs and send the same to virtual NOC 145. Details of such a remote job framework are disclosed in U.S. patent application Ser. No. 14/839,180 entitled Hybrid Task Framework and filed on Aug. 28, 2015, which is incorporated by reference herein in its entirety. The troubleshooting logs that are collected may include any suitable logs relating to the operation of the system or components thereof, such as database dump logs, message queue logs, upgrade-related logs, and so on. In one embodiment, the same troubleshooting logs may be collected regardless of the incident that is reported. In an alternative embodiment, virtual NOC 145 may include logic that allows virtual NOC 145 to select particular troubleshooting logs to collect based on the type of incident that is reported.

It should be understood that hybridity managers in paired on-premise and cloud computing systems work together, requiring a full view of the cross-cloud environment provided by troubleshooting logs that are collected from both systems to diagnose some incidents. For example, a workflow (e.g., a job) may be initiated in virtualized computing system 102 and execute in cloud computing system 150, with results being returned to virtualized computing system 102, or vice versa, and incidents relating to such workflows would requiring troubleshooting log information from both virtualized and cloud computing systems 102 and 150 to diagnose.

In addition to the distributed log collection that is triggered after an incident report is received, virtual NOC 145 also periodically collects information relating to the environments of virtualized computing system 102 and cloud computing system 150. Such environment information, which is also referred to herein as "telemetry" information, may include the build versions of hybridity managers 132 and 134; local infrastructure information such as the build versions of dependent components; the build versions of interconnected components (e.g., gateways, layer 2 concentrators, or other connected system components); service level debugging or trend information such as the number of jobs that are succeeding, failing, and suspended, which is platform information from hybridity managers 132 and 134 that is agnostic of services; system information such as the threads in use, memory usage, central processing unit (CPU) usage, storage usage, job count, etc. Similar to the distributed collection of troubleshooting logs, the job framework discussed above may be used to gather environment information. In one embodiment, hybridity managers 132 and 134 invoke APIs exposed by their dependent components to collect environment information (e.g., the versions of the dependent components system information such as memory usage, etc.) from those dependent components, and hybridity managers 132 and 134 then utilize the job framework to spawn jobs in virtual NOC 145 to store the collected environment information as well as environment information (e.g., the versions of hybridity managers 132 and 134 themselves) provided by hybridity managers 132 and 134 themselves in, e.g., a database, after which the stored environment information may be pushed along with log information to support system 148 after an incident report is received. That is, virtual NOC 145 pushes to support system 148 the incident context and relevant troubleshooting information including collected log information, which may include near-real time ephemeral information or information that is saved/persisted for a longer period of time.

It should be understood that the environment information that is collected periodically may be correlated with troubleshooting log information that is collected after an incident report is received. Analyzing both types of information together may permit faster debugging of some incidents, such as cause and effect relationships. For example, an out of memory error may require an engineering team to analyze system memory usage collected as part of the environment information as well as information on running processes collected as part of the distributed log collection, in which case high memory is the cause and the secondary information that is collected is the effect. That is, together the environment information and the troubleshooting log information from paired sites provide a holistic view of the system that may be required for efficient troubleshooting. Embodiments disclosed herein automate the distributed collection of troubleshooting logs, rather than requiring a support or engineering team to ask the user to, e.g., send certain logs, to analyze those logs, to potentially ask for more logs, etc.

In another embodiment, information that is useful for pro-active debugging may also be collected as part of the environment information. Such pro-active debugging information may include information that is periodically gathered by individual end user services (e.g., VM migration workflows). Virtual NOC 145 then analyzes the pro-active debugging information that is collected and, when an issue (e.g., job count is high, available memory is low, etc.) is encountered, automatically file a support ticket with support system 148, and initiate distributed log collection. That is, the filing of the support ticket and the distributed log collection are triggered in response to an automatically determined incident, as opposed to an incident report that was manually entered into a UI and sent by hybridity manager (e.g., hybridity manager 132 or 134) to virtual NOC 145.

An engineering team may analyze the collected logs and/or environment information to ascertain whether a bug caused the reported incident, in which case a patch build of the hybridity manager may be required. Assuming the reported incident for which logs were collected resolves into a bug, the engineering team may assign a unique ID to such a bug and update support system 148 to associate the support ticket ID with the bug ID, discussed above. Virtual NOC 145 continuously monitors support system 145 for such an association of a bug ID with the support ticket ID and automatically pulls the bug ID from support system 148, after which virtual NOC 145 stores a mapping of the bug ID with the hybridity manager ID that, as discussed above, was mapped to the support ticket ID. Virtual NOC 145 may monitor support system 145 and pull the bug ID by invoking API(s) provided by support system 145. For example, in Jira® and DCPN, any external updates and internal updates are tagged and can correlate to an internal trouble ticket.

Having mapped the bug ID to the hybridity manager ID in database 148, virtual NOC 145 knows that a hybridity manager build fixing such a bug (having the bug ID) should be pushed as an upgrade to the hybridity manager having the associated hybridity manager ID. In one embodiment, new hybridity manager builds are registered with a publishing service provided by virtual NOC 145, which parses metadata associated with such registered builds to determine which bugs those builds resolve. For example, the metadata associated with a registered hybridity manager build may include structured release notes specifying the ID(s) of bug(s) that the build fixes and/or the incident IDs that the build resolves. If virtual NOC 145 determines that the bug IDs specified in metadata associated with a registered build are mapped to hybridity manager ID(s) in database 148, then virtual NOC 145 automatically publishes to each of those hybridity manager(s) a notification to upgrade to the registered build. In addition, other hybridity managers with the same version may also get the upgrade via, e.g., a standard weekly (or other time period) release push. In one embodiment, the bug ID, support ticket ID, and hybridity manager ID may also be archived (as opposed to deleted) for some configurable period of time (e.g., 6 months), before being aged out.

In one embodiment, hybridity manager 132 and/or 134 that receives an upgrade notification from virtual NOC 145 periodically raises an alert, such as a pop-up text box, indicating to a user that the upgrade is available and should be downloaded. The user may then accept or decline the upgrade, or schedule the upgrade for a later time such as a maintenance period. Experience has shown that the rate of upgrade adoption improves when users are periodically annoyed with such alerts.

Figure 2:
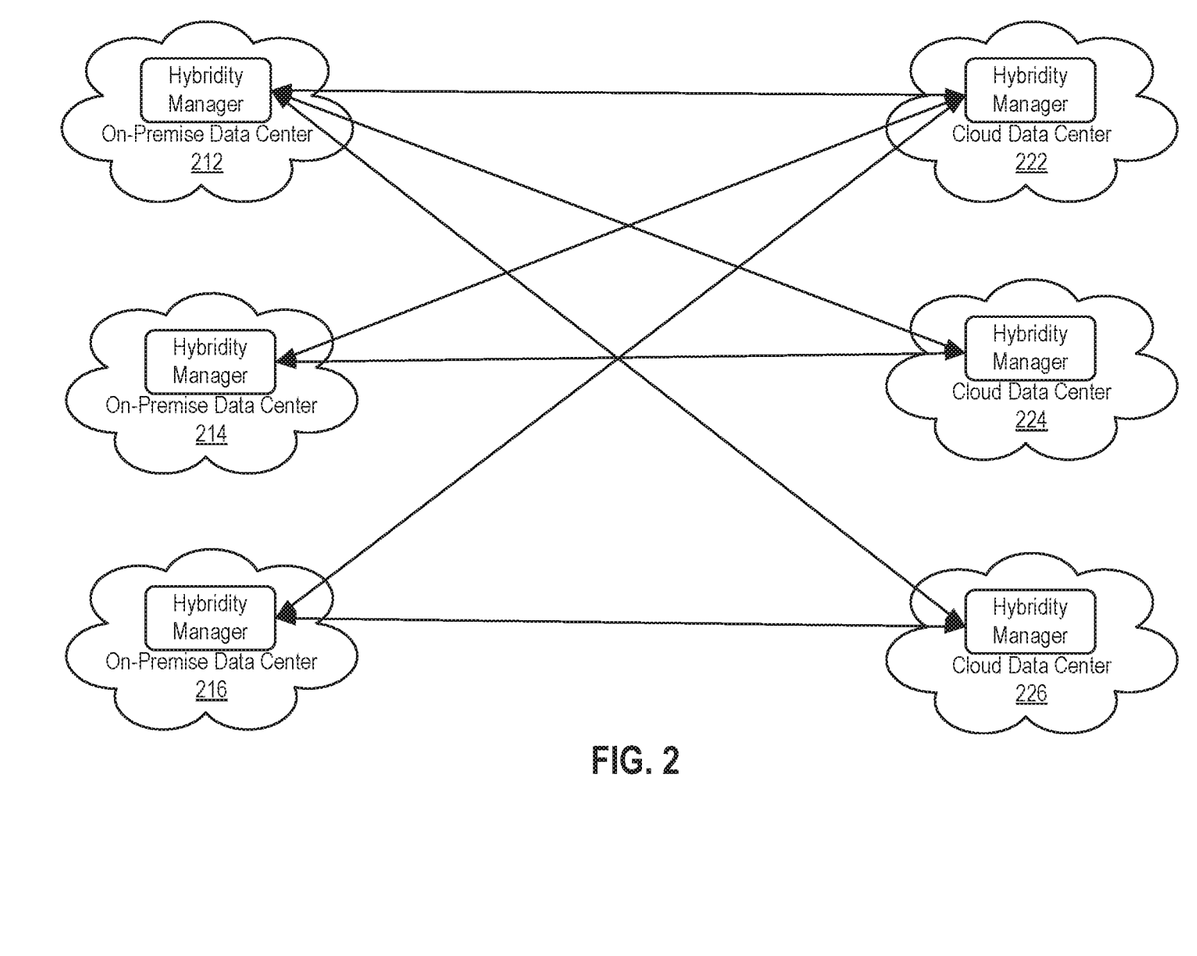
FIG. 2 illustrates distributed log collection in a mesh environment, according to an embodiment.

FIG. 2 illustrates distributed log collection in a mesh environment, according to an embodiment. As shown, a hybrid cloud computing system 200 includes a virtualized computing system 212 that is paired with cloud computing systems 222, 224, and 226; a virtualized computing system 214 that is paired with cloud computing systems 222 and 224; and a virtualized computing system 216 that is paired with cloud computing systems 222 and 226. More generally, an on-premise virtualized computing system may be paired with any number of cloud computing systems, and vice versa, in a hybrid cloud computing system. And the pairing(s) may result in, e.g., a mesh environment such as that of the hybrid cloud computing system 200 or a spoke environment in which one virtualized computing system is paired with multiple cloud computing systems, or vice versa.

Illustratively, each of virtualized computing systems 212, 214, and 216 and cloud computing systems 222, 224, and 226 includes a hybridity manager running therein. As described, in response to receiving an incident report from one of those hybridity managers (or automatically detecting an incident based on pro-active debugging information that is collected), virtual NOC 145 triggers distributed log collection from the virtualized or cloud computing system in which that hybridity manager runs, as well as in paired cloud or virtualized computing systems, respectively. That is, the distributed log collection is based on the topology of the hybrid computing system, and in particular troubleshooting logs are collected across paired virtualized and cloud computing systems, which as described may be useful in diagnosing some incidents.

For example, if virtual NOC 145 were to receive an incident report from the hybridity manager running in virtualized computing system 212, then virtual NOC 145 would trigger distributed log collection in virtualized computing system 212 itself as well as in cloud computing systems 222, 224, and 226 that are paired with virtualized computing system 212. By contrast, logs are not collected from virtualized computing systems 214 and 216 that are not paired with virtualized computing system 212, i.e., that are isolated. As another example, if virtual NOC 145 were to receive an incident report from the hybridity manager running in virtualized computing system 214, then virtual NOC 145 would trigger distributed log collection in virtualized computing system 214 itself as well as cloud computing systems 222 and 224 that are paired with virtualized computing system 214. By contrast, logs are not collected from virtualized computing systems 212 and 216 or cloud computing system 226 that are not paired with virtualized computing system 214.

Figure 3:
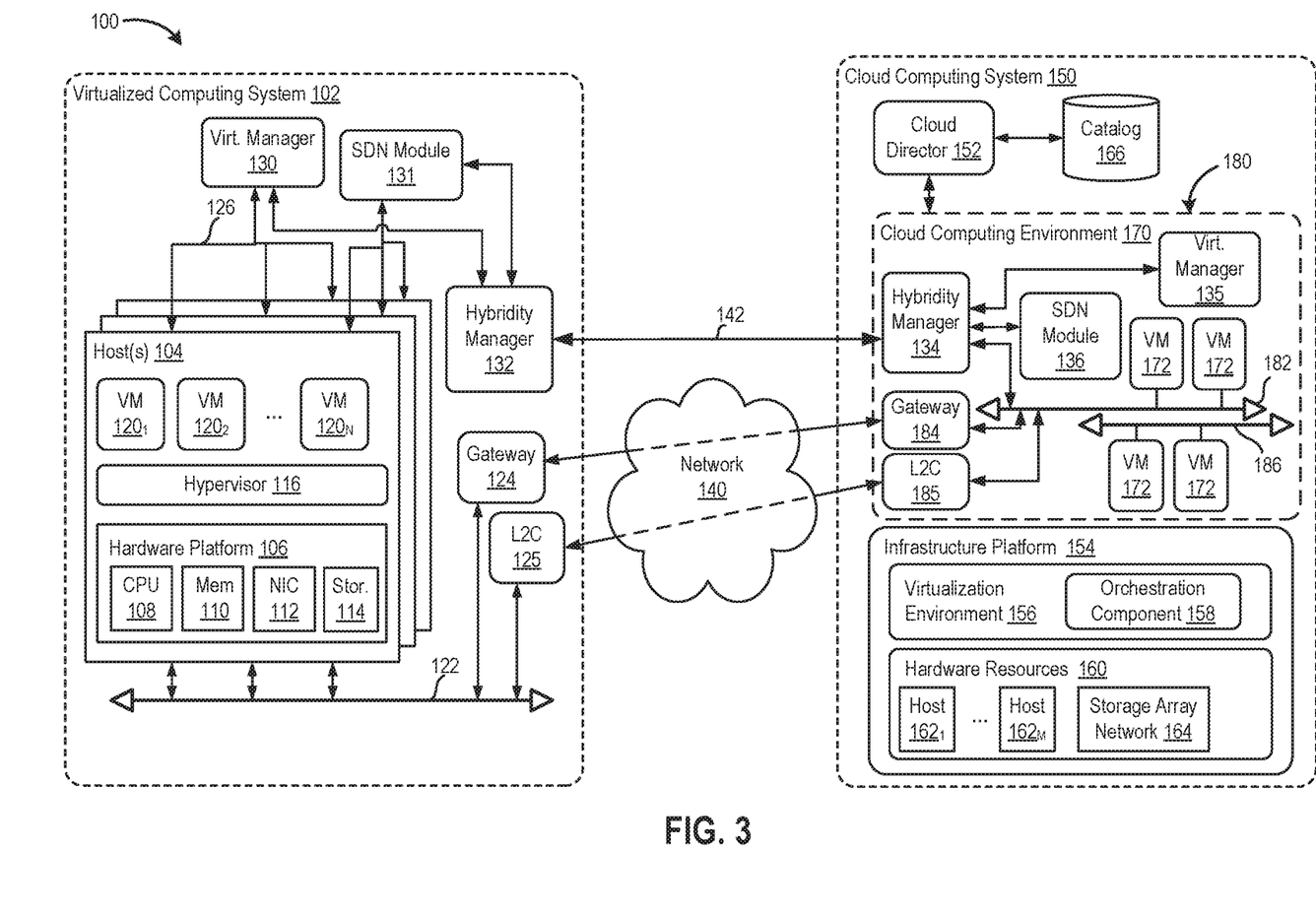
FIG. 3 illustrates in greater detail a hybrid cloud computing system, according to an embodiment.

FIG. 3 illustrates in greater detail hybrid cloud computing system 100, according to an embodiment. Although components of hybrid cloud computing system 100, which includes virtualized computing system 102 and cloud computing system 150, are shown for illustrative purposes, it should be understood that a hybrid cloud computing system may generally have any number of virtualized and cloud computing systems and the virtualized and cloud computing systems in other hybrid cloud computing systems, such as the hybrid cloud computing system 200 discussed above with respect FIG. 2, may include similar components as the virtualized and cloud computing systems 102 and 150 of hybrid cloud computing system 100. As described, hybrid cloud computing system 100 includes virtualized computing system 102 and cloud computing system 150, and hybrid cloud computing system 100 is configured to provide a common platform for managing and executing virtual workloads seamlessly between virtualized computing system 102 and cloud computing system 150.

As shown, virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 214 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines 1101 to 120N (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes VIM 130 that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

Virtualized computing system 102 also includes SDN module 131, which is configured to manage infrastructure and network virtualization, respectively, in virtualized computing system 102. Software defined networking comprises a plurality of hosts in communication over a physical network infrastructure, each host having one or more virtual computing instances such as virtual machines VMs or containers that are connected to logical overlay networks that can span multiple hosts and are decoupled from the underlying physical network infrastructure. Logical networks may be enabled and managed in the virtual data center by a SDN module (e.g., a management plane and a central controller) such as SDN module 131 that runs on one or more hosts (e.g., as a distributed controller/management plane or a single controller/management plane running directly on the one or more hosts, within one or more VMs, etc.). Examples of SDN modules include VMware NSX-V (NSX® for vSphere®) and NSX-T, available from VMware, Inc.

As shown, virtualized computing system 102 further includes hybridity manager 132 that is in communication with VIM 130 and configured to integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 3, infrastructure platform 154 includes hardware resources 160 having computing resources (e.g., hosts 1621 to 162N), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 3, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 250. The stretched network may be separate from the network used by gateways 124 and 184 so that, e.g., VM migration traffic over network used by gateways 124 and 183 does not create latency in stretched network.

As shown, cloud computing system 150 includes hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with VIM 135 and SDN module 136, which may perform similar functionalities as VIM 130 and SDN module 131, described above.

Figure 4:
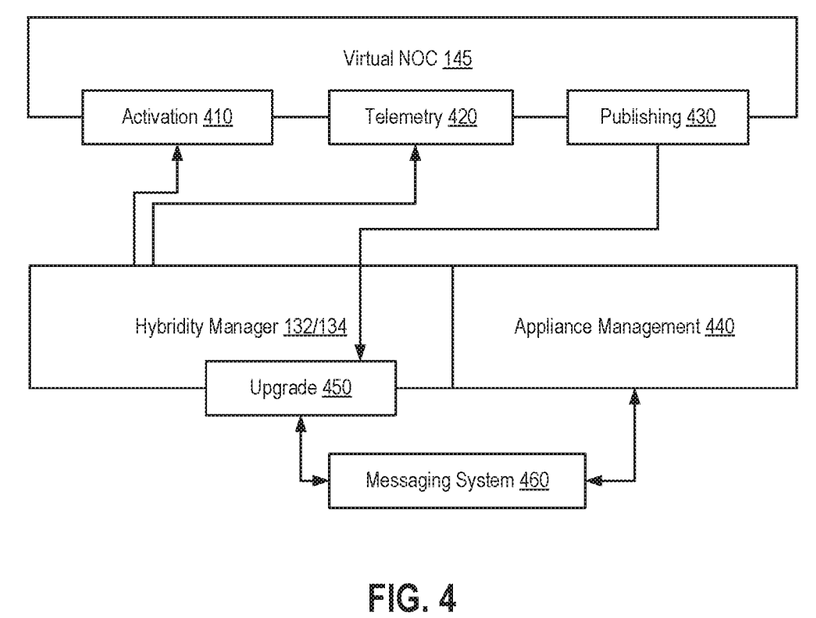
FIG. 4 illustrates services provided by a virtual network operations center, according to an embodiment.

FIG. 4 illustrates services provided by virtual NOC 145, according to an embodiment. As shown, virtual NOC 145 provides an activation service 410, a telemetry service 420, and a publishing service 430. Hybridity managers (e.g., hybridity managers 132 and 134) may register themselves with activation service 310 prior to use. Such registration may include, e.g., entering a product key that activates the installation so that the hybridity manager instance can be used. In addition, pairings of on-premise hybridity managers (e.g., hybridity manager 132) and cloud hybridity managers (e.g., hybridity manager 134) may be specified with activation service 310. As described, paired hybridity managers may integrate virtualized computing resources provided by their virtualized and cloud computing systems to form a unified hybrid computing platform. In one embodiment, a communication channel is also established between each pairing of hybridity managers in the virtualized and cloud computing systems after the pair is registered with virtual NOC 145.

Telemetry service 420 is configured to periodically collect information relating to the environments of virtualized and cloud computing system 102 and 150 environments. As described, such environment information may include the build versions of hybridity managers; local infrastructure information such as the build versions of dependent components; the build versions of interconnected components; service level debugging/trend information such as the number of jobs that are succeeding, failing, and suspended; system information such as the threads in use, memory usage, CPU usage, storage usage, job count, etc. In one embodiment, hybridity managers (e.g., hybridity managers 132 and 134) invoke APIs provided by their dependent components to collect environment information from those dependent components and hybridity managers 132 and 134 then utilize the job framework described above to spawn jobs in virtual NOC 145 that store the collected environment information as well as environment information from hybridity managers themselves in, e.g., a database. Virtual NOC 145 may then provide such stored environment information, along with troubleshooting log information collected via distributed log collection, to support system 148 after receiving an incident report.

Publishing service 430 is configured to publish notifications of upgrades to hybridity managers. That is, the upgrades to hybridity managers are server-initiated upgrades, and once the appropriate upgrade builds are identified, publishing service 430 pushes notifications of the same to the appropriate hybridity managers.

Illustratively, an upgrade notification receiving service 450 running in hybridity manager 132 or 134 is configured to receive notifications published by publishing service 430 and push such notifications to a messaging system 460 where the notifications are queued. In one embodiment, messaging system 460 is used to support the remote job framework discussed above. In a particular embodiment, messaging system 460 may be the Apache Kafka platform. An appliance management process 440 running at a root level, which is a higher permission level than the rest of hybridity manager 132 or 134, then receives the notifications from the messaging system 460 queue and performs the actual upgrade, which may include, e.g., pulling the appropriate build binary from server(s) 148, replacing binaries, making configuration changes, upgrading a database, and/or rebooting. As described, the upgrade is only performed after the user accepts the upgrade (or at a scheduled later time), and in one embodiment the messaging system 460 event may be a trigger sent to appliance management process 440 to ensure the upgrade triggers with the proper user context. It should be understood that the appliance management process 440 may also perform functionalities not related to upgrading, such as the initial bootstrapping of hybridity manager 132 or 134 and maintenance-related activities.

Figure 5:
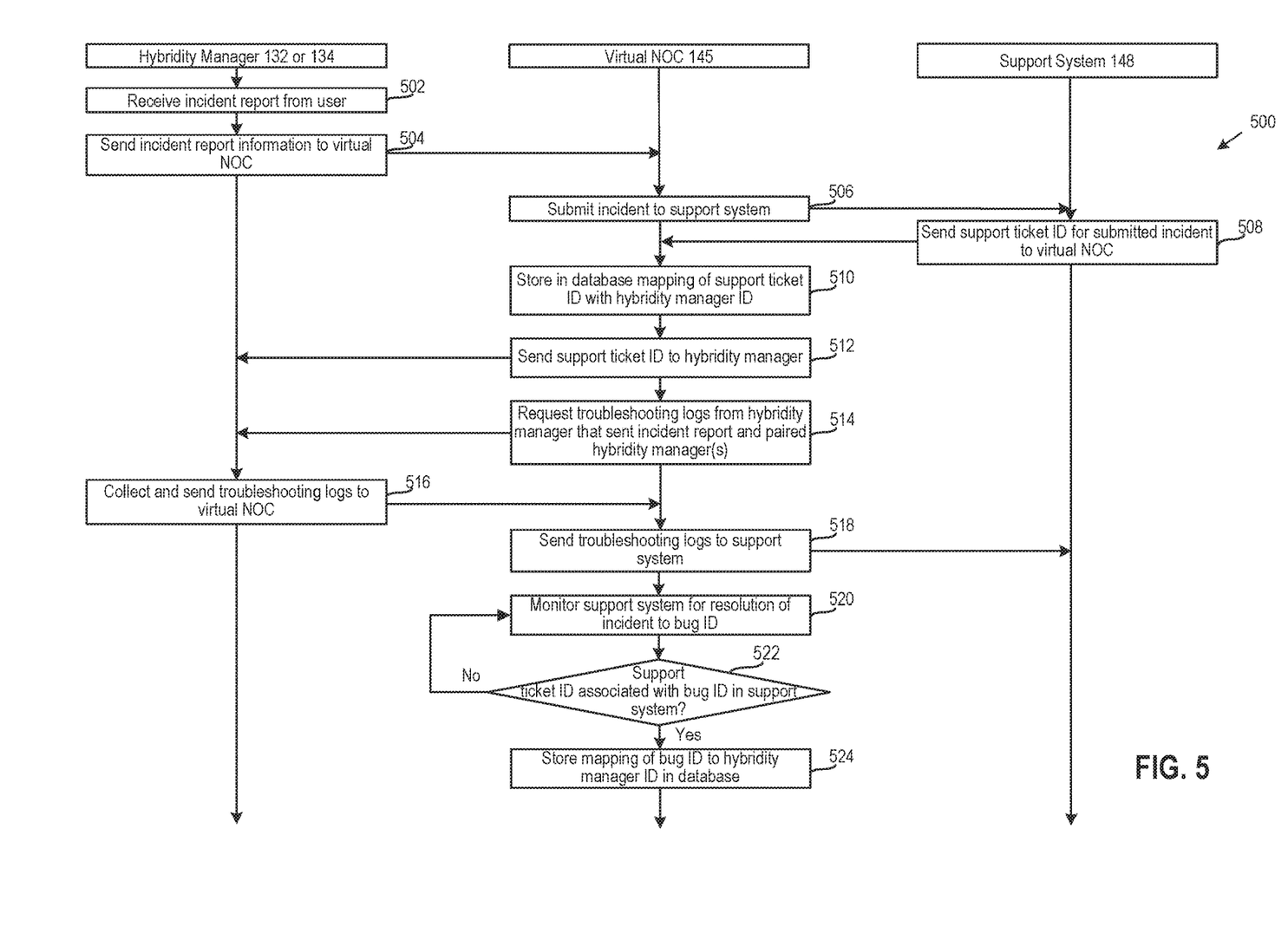
FIG. 5 illustrates a method for reporting incidents in a hybrid cloud computing system, according to an embodiment.

FIG. 5 illustrates a method 500 for reporting incidents in a hybrid cloud computing system, according to an embodiment. As shown, method 500 begins at step 502, where hybridity manager 132 in virtualized computing system 102 or hybridity manager 134 in cloud computing system 150 receives an incident report from a user. In one embodiment, the incident report may include a summary and a description of a problem that a user experienced with the hybridity manager 132 or 134. The user may submit the incident report via any suitable UI, such as a web page that includes a button the user can click on to report the incident and thereafter provide the summary and description of the incident. In one embodiment, the UI provides a single pane of glass for the entire hybrid cloud, allowing the user to report incidents and view system details from virtualized and cloud computing systems of the hybrid cloud with the same UI.

At step 504, hybridity manager 132 or 134 automatically sends information from the incident report to virtual NOC 145. Then, at step 506, virtual NOC 145 submits the incident to support system 148. In one embodiment, virtual NOC 145 automatically files a support ticket, which includes the incident report information received at step 502, with support system 148.

At step 508, support system 148 provides a support ticket ID for the submitted incident to virtual NOC 145. Virtual NOC 145 then stores in its database 146 a mapping of the support ticket ID with an ID of hybridity manager 132 or 134 from which the incident was reported at step 510.

Then, at step 512, virtual NOC 145 sends the support ticket ID to hybridity manager 132 or 134. The support ticket ID may then be shown to the user via the UI of hybridity manager 132 or 134. In addition, the UI may provide a link to that support ticket which takes users to a UI (e.g., a website) of support system 148 that permits the users to update comments associated with the support ticket. For example, some back-and-forth e-mails or chats may be sent between a user and the support team, and such e-mails/chats may be stored in support system 148. The support ticket ID may be used to communicate with support system 148 in these and other cases. However, it should be understood that virtual NOC 145 monitors for results, including what bug the incident resolves into, rather than the general history of the support ticket such as chats, etc.

At step 514, virtual NOC 145 requests troubleshooting logs from hybridity manager 132 or 134 that sent the incident report and related hybridity manager(s) in cloud computing system(s) or on-premise computing system(s), respectively. As described, hybridity managers are registered with virtual NOC 145, which is then aware of which on-premise and cloud computing systems are paired and able to trigger distributed log collection across paired sites. Such a distributed collection of troubleshooting logs is beneficial, as hybridity managers in paired on-premise and cloud computing systems work together, requiring a full view of the cross-cloud environment provided by logs from both systems to effectively diagnose some incidents.

As described, a jobs framework may be implemented in one embodiment to support coordinated job execution across multiple sites and permit communication channels to be created between paired sites when hybridity managers (e.g., hybridity manager 132 or 134) register with virtual NOC 145. In order to obtain troubleshooting logs in such a case, virtual NOC 145 may, in one embodiment, spawn a job to send a remote task to hybridity manager 132 or 134 that sent the incident report, as well as in paired hybridity manager(s), to collect the requisite logs and send back the same to virtual NOC 145.

In one embodiment, a one-time user consent is required before logs are automatically collected. In such a case, if consent has not yet been given, then an alert requesting such consent may be displayed in a UI associated with the hybridity manager 132 or 134, and an e-mail also be sent for the alert, prior to distributed log collection. The user may either acknowledge or reject the request in the alert, with distributed log collection being performed only if the request is acknowledged.

At step 516, hybridity manager 132 or 134 collects and sends troubleshooting logs to virtual NOC 145. Although shown for simplicity with respect to hybridity manager 132 or 134, it should be understood that virtual NOC 145 also collects troubleshooting logs from paired cloud or on-premise computing system(s). In one embodiment, the collection of troubleshooting logs may include invoking APIs provided by dependent components and bundling the logs together in a bundle file that is then sent to virtual NOC 145. In addition to troubleshooting logs collected in response to particular incident reports, virtual NOC 145 also periodically collects cross-cloud environment information from registered hybridity managers via telemetry service 420, as described above.

At step 518, virtual NOC 145 sends the troubleshooting logs and environment information to support system 148. For example, virtual NOC 145 may upload the logs and environment information to support system 148 or update support system 148 with Hypertext Transfer Protocol (HTTP) links to the logs and environment information, thereby allowing users on an engineering team to access such information for troubleshooting purposes.

At step 520, virtual NOC 145 monitors support system 148 for resolution of the incident to a bug ID. In one embodiment, virtual NOC 145 monitors support system 145 by invoking API(s) provided by support system 145. It is assumed that the engineering team reviewing troubleshooting logs and environment information will resolve each unique bug into a corresponding bug ID, and that if the same bug is encountered again, it will be resolved into the same bug ID. Virtual NOC 145 thus monitors support system 148 to determine whether the support ticket ID for the incident submitted at step 506 has been associated with a bug ID in support system 148.

If virtual NOC 145 determines at step 522 that the support ticket ID for the incident received from hybridity manager 132 or 134 has been associated with a bug ID in support system 148, then at step 524, virtual NOC 145 stores a mapping of the bug ID to hybridity manager 132 or 134's ID in database 146. That is, virtual NOC 145 automatically pulls the bug ID information from support system 148 and stores the bug ID as being related to the hybridity manager 132 or 134 which sent the incident report resolving into that bug ID.

Figure 6:
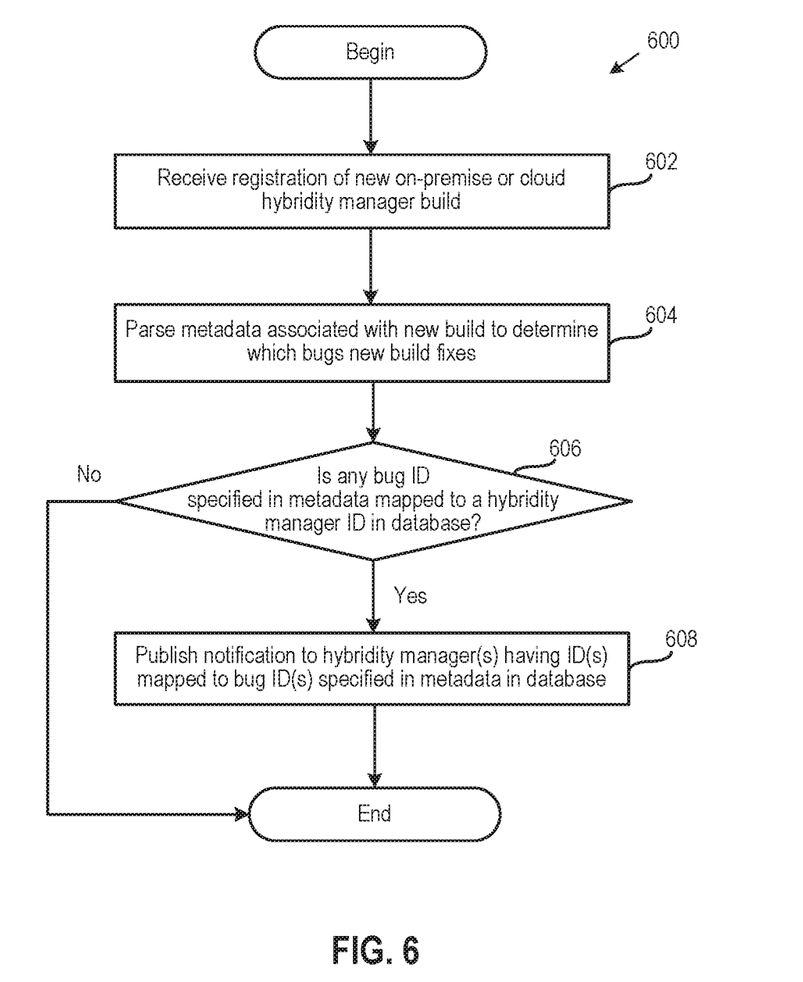
FIG. 6 illustrates a method for publishing a hybridity manager build that fixes a hybridity manager bug, according to an embodiment.

FIG. 6 illustrates a method 600 for publishing a hybridity manager build that fixes a hybridity manager bug, according to an embodiment. As shown, method 600 begins at step 602, where a new on-premise or cloud hybridity manager build is registered with virtual NOC 145. As described, a user may register the new build with virtual NOC 145 via a UI, such as a website, that is associated with virtual NOC 145. The new build's binary may also be uploaded to server(s).

At step 604, virtual NOC 145 (and in particular, publishing service 430 in virtual NOC 145) parses metadata associated with the new build to determine which bugs the new build resolves. In one embodiment, the metadata may include structured release notes, input via the same UI by the user who registers the hybridity manager build with virtual NOC 145. In such a case, the structured release notes may specify the incidents (bug IDs and/or incident IDs) that the new build resolves.

If virtual NOC 145 determines at step 606 that any bug ID specified in the metadata for the new build is mapped to a hybridity manager ID in database 146, then virtual NOC 145 (and in particular, publishing service 430 in virtual NOC 145) publishes a notification to the hybridity manager(s) having ID(s) mapped to bug ID(s) specified in the metadata at step 608. As described, each of the hybridity manager(s) that receive such a notification will then periodically raise an alert in a UI to inform users of the new build and urge them to upgrade. For example, the alert may specify the build ID and the bug ID that has been fixed, among other things. In an alternative embodiment, virtual NOC 145 may indicate, via a UI, which hybridity manager ID(s) are mapped to bug ID(s) being fixed by the new build, and a user may manually select hybridity manager ID(s) to publish the new build to. As described, other hybridity managers with the same version may also get the upgrade via, e.g., a standard weekly (or other time period) release push.

In addition, if a user reports a new incident with another hybridity manager that resolves into the same bug for which a build has already been registered, the method 500 described above does not need to be repeated. In one embodiment, virtual NOC 145 automatically pushes the previously registered build to the other hybridity manager in response to the new incident report when the new incident report resolves into the same bug ID that was fixed by the previously registered build.

Although described above primarily with respect to incident reports specifying hybridity managers problems faced by users, techniques disclosed herein may also be adapted to automatically track feature requests made by users (as opposed to incidents that are reported) and publish available upgrade builds for the same. Although described above primarily with respect to bugs, techniques disclosed herein are also applicable to issues other than bugs. That is, reported incidents may generally resolve into issues that are any detected problems, not just bugs, and such issues may be given issue IDs, with similar processing performed as that described above with respect to bug IDs.

Advantageously, techniques disclosed herein automatically file and track support tickets, collect troubleshooting logs, and publish upgrade notifications when appropriate hybridity manager builds are available, thereby eliminating the back-and-forth manual steps of the traditional software support lifecycle. Experience has shown that doing so can reduce the time to resolution of reported incidents. In particular, a virtual NOC having a centralized view of distributed, cross-cloud hybridity manager instances initiates distributed log collection across paired on-premise and cloud computing systems, which together with collected environment information can be used to diagnose incidents without requiring a support or engineering team to (repeatedly) ask users for troubleshooting logs. In addition, techniques disclosed herein permit the automatic reusability of incidents, as upgrade notifications are also published to later users who encounter incidents that resolve into the same bugs that are fixed by previously registered builds.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. Virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method, comprising:
receiving, from a first hybridity manager in a first on-premise or cloud computing system of a hybrid cloud computing system, a first report of an incident;
submitting, to a support system:
information on the incident from the first report, and
troubleshooting logs received from the first on-premise or cloud computing system and one or more paired cloud or on-premise computing systems after the submitting of the information;
storing a mapping between an identifier (ID) of an issue associated with the incident and an ID of the first hybridity manager, wherein the association between the issue and the incident is determined by monitoring the support system after the submitting of the information and the troubleshooting logs;
responsive to a hybridity manager build being registered that is specified as fixing the issue, pushing a first upgrade notification to the first hybridity manager based, at least in part, on the stored mapping between the ID of the issue and the ID of the first hybridity manager.

2. The method of claim 1, wherein the troubleshooting logs are received via the first hybridity manager in the first on-premise or cloud computing system and one or more other hybridity managers in the one or more paired cloud or on-premise computing systems.

3. The method of claim 2, further comprising:
periodically receiving environment information via the first hybridity manager and the one or more other hybridity managers, wherein the received environment information includes at least one of infrastructure information, service level debugging or trend information, system information, information on build versions of the first hybridity manager and the one or more other hybridity managers, or information on build versions of interconnected components.

4. The method of claim 2, wherein receiving the troubleshooting logs includes spawning jobs that include tasks executed by the first hybridity manager and the one or more other hybridity managers.

5. The method of claim 1, further comprising:
submitting a support ticket specifying the incident to the support system;
storing a mapping of an ID of the support ticket to the ID of the first hybridity manager;
sending the ID of the support ticket to the first hybridity manager; and
determining the ID of the issue associated with the incident based, at least in part, on an association of the ID of the issue with the ID of the support ticket in the support system.

6. The method of claim 1, wherein the registered hybridity manager build is specified as fixing the issue in metadata associated with the registered hybridity manager build.

7. The method of claim 1, further comprising:
responsive to determining that another incident specified in a second report, which is received from a second hybridity manager in a second on-premise or cloud computing system, resolves into the same ID of the issue, pushing a second upgrade notification to the second hybridity manager.

8. The method of claim 1, wherein the first report is entered by a user via a user interface used to report incidents across the on-premise and cloud computing systems in the hybrid cloud computing system.

9. The method of claim 1, wherein the first hybridity manager is configured to, together with one or more other hybridity managers in the one or more paired cloud or on-premise computing systems, integrate virtualized computing resources provided by the first on-premise or cloud computing system with virtualized computing resources of the one or more paired cloud or on-premise computing systems.

10. A non-transitory computer-readable storage medium storing instructions, which when executed by a computer system, perform operations comprising:
receiving, from a first hybridity manager in a first on-premise or cloud computing system of a hybrid cloud computing system, a first report of an incident;
submitting, to a support system:
information on the incident from the first report, and
troubleshooting logs received from the first on-premise or cloud computing system and one or more paired cloud or on-premise computing systems after the submitting of the information;
storing a mapping between an identifier (ID) of an issue associated with the incident and an ID of the first hybridity manager, wherein the association between the issue and the incident is determined by monitoring the support system after the submitting of the information and the troubleshooting logs;
responsive to a hybridity manager build being registered that is specified as fixing the issue, pushing a first upgrade notification to the first hybridity manager based, at least in part, on the stored mapping between the ID of the issue and the ID of the first hybridity manager.

11. The computer-readable storage medium of claim 10, wherein the troubleshooting logs are received via the first hybridity manager in the first on-premise or cloud computing system and one or more other hybridity managers in the one or more paired cloud or on-premise computing systems.

12. The computer-readable storage medium of claim 11, the operations further comprising:
periodically receiving environment information via the first hybridity manager and the one or more other hybridity managers, wherein the receiving environment information includes at least one of infrastructure information, service level debugging or trend information, system information, information on build versions of the first hybridity manager and the one or more other hybridity managers, or information on build versions of interconnected components.

13. The computer-readable storage medium of claim 11, wherein receiving the troubleshooting logs includes spawning jobs that include tasks executed by the first hybridity manager and the one or more other hybridity managers.

14. The computer-readable storage medium of claim 10, the operations further comprising:
submitting a support ticket specifying the incident to the support system;
storing a mapping of an ID of the support ticket to the ID of the first hybridity manager;
sending the ID of the support ticket to the first hybridity manager; and
determining the ID of the issue assigned to the incident based, at least in part, on an association of the ID of the issue with the ID of the support ticket in the support system.

15. The computer-readable storage medium of claim 10, wherein the registered hybridity manager build is specified as fixing the issue in metadata associated with the registered hybridity manager build.

16. The computer-readable storage medium of claim 10, the operations further comprising:
responsive to determining that another incident specified in a second report, which is received from a second hybridity manager in a second on-premise or cloud computing system, resolves into the same ID of the issue, pushing a second upgrade notification to the second hybridity manager.

17. The computer-readable storage medium of claim 10, wherein the first report is entered by a user via a user interface used to report incidents across the on-premise and cloud computing systems in the hybrid cloud computing system.

18. The computer-readable storage medium of claim 10, wherein the first hybridity manager is configured to, together with one or more other hybridity managers in the one or more paired cloud or on-premise computing systems, integrate virtualized computing resources provided by the first on-premise or cloud computing system with virtualized computing resources of the one or more paired cloud or on-premise computing systems.

19. A system, comprising:
a processor; and
a memory, wherein the memory includes an application program configured to perform operations comprising:
receiving, from a first hybridity manager in a first on-premise or cloud computing system of a hybrid cloud computing system, a first report of an incident;
submitting, to a support system:
information on the incident from the first report, and
troubleshooting logs receiving from the first on-premise or cloud computing system and one or more paired cloud or on-premise computing systems after the submitting of the information;
storing a mapping between an identifier (ID) of an issue associated with the incident and an ID of the first hybridity manager, wherein the association between the issue and the incident is determined by monitoring the support system after the submitting of the information and the troubleshooting logs;
responsive to a hybridity manager build being registered that is specified as fixing the issue, pushing a first upgrade notification to the first hybridity manager based, at least in part, on the stored mapping between the ID of the issue and the ID of the first hybridity manager.

* * * * *